United States Patent [19]

Castro

[11] 4,109,835
[45] Aug. 29, 1978

[54] DEVICE FOR DISPENSING MEASURED QUANTITIES OF MATERIAL

[76] Inventor: Genaro Afalla Castro, 68 Stuyvesant Ave., Newark, N.J. 07106

[21] Appl. No.: 713,980

[22] Filed: Aug. 12, 1976

[51] Int. Cl.² .............................................. G01F 11/40
[52] U.S. Cl. ....................................... 222/449; 222/451
[58] Field of Search ............... 222/451, 361, 449, 445, 222/450

[56] References Cited
FOREIGN PATENT DOCUMENTS 510,506  1/1955  Italy ........................................ 222/451

Primary Examiner—Robert B. Reeves
Assistant Examiner—John P. Shannon
Attorney, Agent, or Firm—Frederick B. Luludis

[57] ABSTRACT

A dispenser is disclosed for storing and rapidly dispensing measured quantites of powdered or granulated material. The dispenser has a nonmoving measuring chamber having top and bottom sides which are alternately opened and closed upon activation of the dispenser to fill the measuring chamber from a storage chamber and then discharge the measured quantity of material in the measuring chamber into a receiving receptacle.

2 Claims, 3 Drawing Figures

DEVICE FOR DISPENSING MEASURED QUANTITIES OF MATERIAL

FIELD OF THE INVENTION

This invention relates to apparatus capable of storing and dispensing measured quantities of a material.

The primary object of this invention is to provide a simple apparatus that enables the user thereof to easily and quickly dispense measured quantities of a material, such as coffee or flour by operating an easily actuated means.

Another important object of this invention is to provide a dispensing apparatus that is easy to manufacture and can be assembled and disassembled, without tools, for repair or cleaning by a layman not versed in the mechanical arts.

Still another important object of this invention is to provide a means for storing the material to be dispensed in a highly sanitary manner, until dispensed by actuation of the apparatus.

A further object of this invention is to provide a decorative accompaniment that will pleasingly embellish the decor of the location whereat the invention is located for use, such as a kitchen.

A feature of this invention resides in the structure of the dispensing mechanism that insures that the material readily flows when the actuated means has been operated by the user of the apparatus.

Other features of this invention reside in its simple structure that makes it easy and inexpensive to manufacture, and its ease of assembly and disassembly.

PRIOR ART

The need often arises to quickly and accurately dispense measured quantities of a granulated or powdered material, such as, in a restaurant to fill salt and pepper shakers, in chemical and pharmaceutical laboratories for the preparation of chemical compounds, or in the home in the preparation of drinks, baking, and cooking. This invention provides the means to insure that a quantity of material is accurately measured before being dispensed into a receptacle.

In the prior art there are a variety of granulated or powdered material dispensers having the capability of dispensing measured quantities of material. Generally, these dispensers are not practical for the home because they have a multiplicity of complex parts, they are relatively expensive to manufacture, not easily repairable, and are not easy to clean to maintain sanitary conditions or to change the material being measured. In some combinations, a rotating valve plate having a cavity in the side thereof is employed as the means of obtaining a measured quantity of granular material. More often than not, granular material becomes lodged between the rotating valve plate and its housing, the sweeping action of the rotating valve plate crushes or shears the material into particles thereby causing the material to become easily lodged between the plate and housing. After a period of use, a sufficient quantity of material will become lodged between the rotating valve plate and its housing to inhibit the rotational movement of the valve plate. At which time, the dispenser has to be dismanteled and cleaned. In addition, if the material that becomes lodged between the plate and housing is organic it will putrify and and contaminate the remaining material in the storage chamber. Further, the rotating valve plate shears the granulated material as the rotating valve plate sweeps across the storage chamber outlet thereby changing the physical and or chemical characteristics of the granulated material that is to be measured and used.

In other combinations, two discs and a measured well are used to obtain a measured quantity of granular material. The cumbersome operation of the apparatus requires the user to first operate one disc valve to prevent material from escaping from the metered well, secondly, operate a second disc valve to allow the advance of material from a storage hopper to the metered well, thirdly, release the second operated disc valve to cutoff further advance of material from the storage hopper to the well, and fourthly, release the first operated disc valve to allow the material to flow from the well to a receptacle.

SUMMARY OF THE INVENTION

My invention satisfies these needs of the prior art. The preferred embodiment of my novel dispenser disclosed herein is made up of four or five parts all but one of which may be inexpensively and simply manufactured from molded plastic. These dispenser parts may be assembled or disassembled in a fraction of a minute and without tools by a person having little or no mechanical aptitude. Thus, the material in the dispenser may be easily changed, and the dispenser may easily be thoroughly cleaned to maintain it in a sanitary condition. In addition, the dispenser may simply and inexpensively be repaired without returning it to a repair facility.

The invention is best understood after reading the following detailed description in conjunction with the drawings in which.

DETAILED DESCRIPTION

Figure 1:
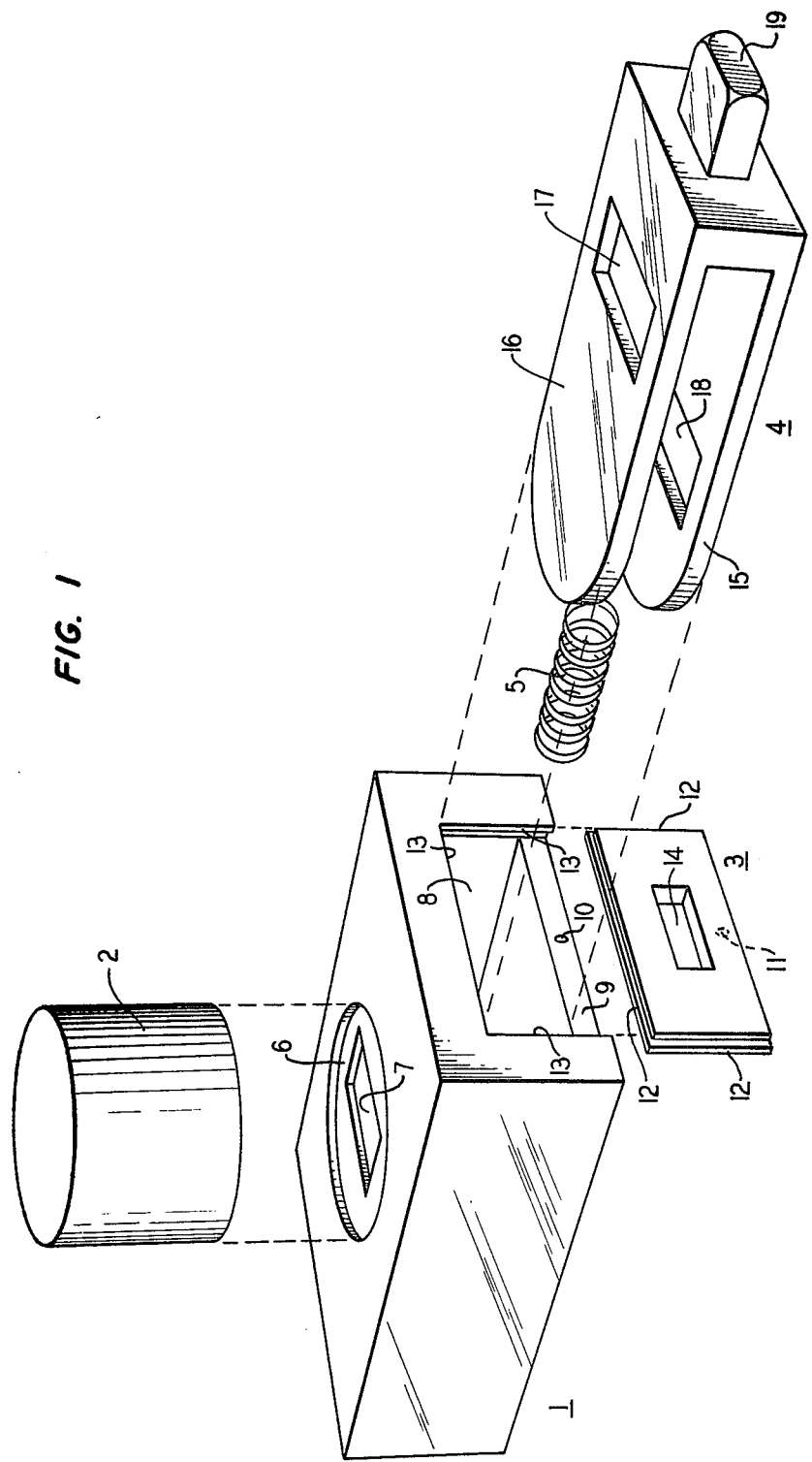
FIG. 1 is a perspective disassembly view of my novel dispenser.

Referring to FIG. 1, therein is shown a perspective disassembly of my novel dispenser, comprising dispenser body 1, receptacle 2, retainer plate 3, actuator 4, and actuator spring 5. Body 1 has a recess 6 that receives the bottom edge of receptacle 2, and in the bottom of recess 6 is passage 7 through which powdered, granulated or other material (not shown) stored in receptacle 2 passes into the measuring cavity (not shown in this figure) within body 1. Channel 8 in the end wall of body 1 receives actuator 4 and actuator spring 5. Channel 8 and passage 7 are shown in greater detail in FIG. 2 and are described in further detail further in the specification. To assemble the dispenser, actuator 4 and spring 5 are inserted into channel 8 until actuator nose 19 is within channel 8, and then the edge members 12 of retainer plate 3 are inserted into grooves 13 of body 1 until retainer plate 3 snaps into place and fully covers the opening to channel 8.

Body 1, receptacle 2, plate 3, and actuator 4 may be advantageously molded out of high impact plastic of any desired color. Receptacle 2 may be force fit or screwed (molded threads) into recess 6 of body 1 and a cap (not shown) will close the top of receptacle 2.

Body 1 is shown rectangular in shape for ease in pictorially showing my novel dispenser, but it may be of any desired shape. In addition, body 1 and receptacle 2 are shown as two separate members for ease of showing the invention, but they may be made into one member of pleasing shape.

It should be noted that my novel dispenser comprises only five pieces or members and only four pieces when body 1 and receptacle 2 are made as one part. In addition, it should be noted that only one metal part, spring 5, is used in my dispenser, and no screws or other fasteners are utilized. The result is an economical and simple dispenser that is easy to assemble and disassemble for cleaning by a person having little or no mechanical skill and without the need for tools. The simple assembly without tools will be understood upon reading the remainder of this specification.

While my novel dispenser will most likely be oriented with receptacle 2 on top of body 1 so that material in receptacle 2 will flow via passage 7 into the measuring cavity under the influence of gravity, the dispenser may be oriented in other positions and pressure means can be provided to then make the material in receptacle 2 flow into the measuring cavity within body 1.

The sides of the opening in the end wall of body 1 have grooves 13 in three sides thereof as indicated. The purpose of grooves 13 is to receive the three edges 12 of plate 3 as it is inserted into grooves 13 from the bottom of body 1 as shown. Plate 3 is inserted with grooves 13 slidably engaging edge members 12 until plate 3 is fully inserted. To aid in the retention of plate 3 in the entrance to passage 8, hemispherical depression 10 is molded into bottom edge 9 of body 1 in the manufacture of the plate.

As plate 3 is inserted, hemispherical protrusion 11 will come into contact with the bottom of edge 9, further insertion force causes protrusion 11 to ride up on edge 9 and will deform plate 3. Upon further and final insertion of plate 3, dimple 11 coincides with and more or less falls into depression 10, relieving the deforming force on plate 3 which returns to its normal flat posture. This may be seen in FIGS. 2 and 3. With protrusion 11 being in depression 10, plate 3 is prevented from readily sliding out of groove 13.

To remove plate 3 from grooves 13 for dispenser disassembly, a downward force causes protrusion 11 to ride out of depression 10 by deforming plate 3 until protrusion 11 passes below edge 9.

Figure 2:
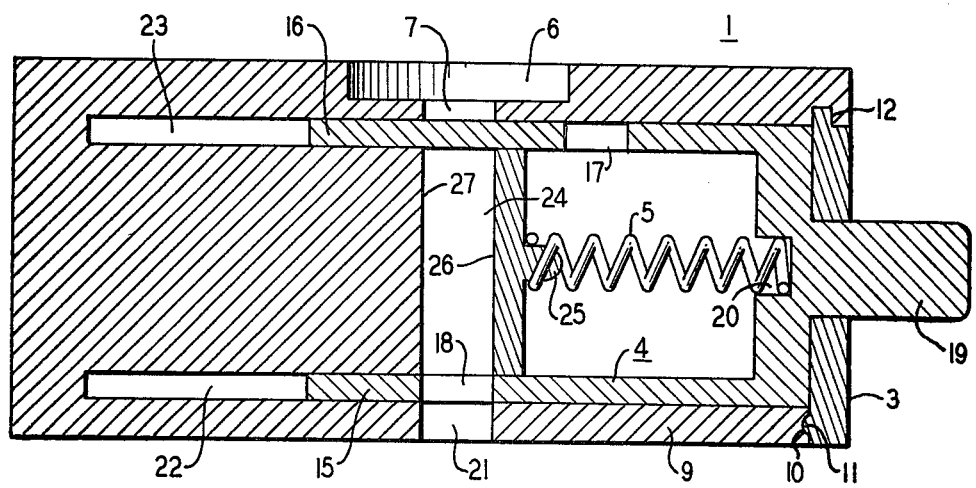
FIG. 2 is a cutaway view of the body of the dispenser showing the assembly of the actuator and actuator spring within the body of the dispenser.
Figure 3:
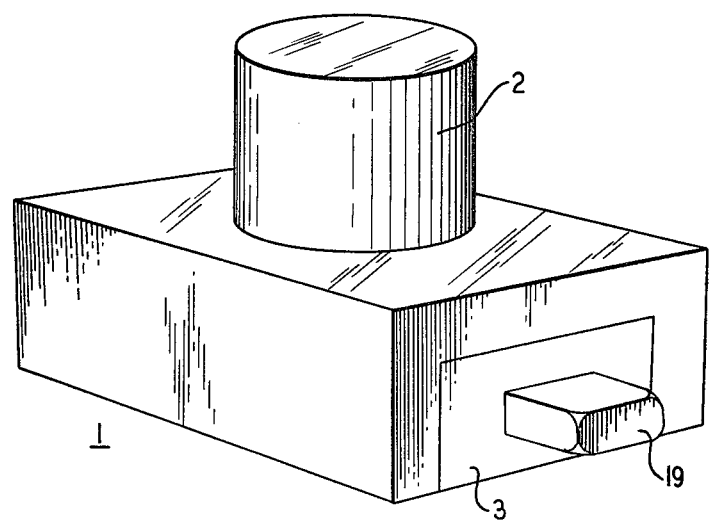
FIG. 3 is a perspective view of my assembled novel dispenser.

To fully assemble my novel dispenser, one end of spring 5 is placed in cavity 20 in the back of actuator nose 19, as seen in in FIG. 2, and the two pieces are inserted into channel 8, in the manner shown in FIGS. 1 and 2, with members 15 and 16 being inserted first. Upon actuator 4 and spring 5 being inserted into channel 8 spring 5 will be guided onto pin 25 as shown in FIG. 2 and described further in this specification. Actuator 4 and spring 5 are inserted until spring 5 is compressed and until nose 19 is within channel 8 past grooves 13. Plate 3 is then inserted, as previously described, until it locks into place. Actuator 4 is then released and compressed spring 5 expands pushing nose 19 through hole 14 in plate 3. The fully assembled state is seen in FIG. 3. Nose 19 is advantageously rounded to facilitate it passing easily through hole 14. Members 15 and 16 are advantageously rounded to facilitate their insertion into channel 8 of body 1.

To disassemble my novel dispenser, the above described procedure is simply reversed. Actuator 4 is pushed into body 1 until nose 19 is past plate 3, then plate 3 is removed by a downward force thereon, and actuator 4 and spring 5 are then removed. This procedure is not only simple but can be accomplished rapidly.

Briefly, when my dispenser is assembled and a material is placed into receptacle 2, a measured quantity of the material is dispensed out of an opening in the bottom of body 1 (not shown in FIG. 1, but shown in FIG. 2) by pushing actuator 4 into body 1 until nose 19 is approximately flush with plate 3 and then releasing actuator 4.

Turning now to describe in detail how the elements of my novel dispenser function to measure and discharge measured quantities of whatever material is stored in receptacle 2, with reference to FIG. 2.

Actuator 4 includes plates 15 and 16, each of which has a passage 17 and 18 therethrough respectively as seen in FIG. 1. It should be noted that passages 17 and 18 do not vertically coincide or vertically overlap at all. When actuator 4 is fully assembled into body 1, and the dispenser is in its normal unoperated state, passage 17 of actuator 4 does not coincide with passage 7 in body 1, but rather a solid portion of actuator member 16 closes off passage 7, as shown in FIG. 2, so that material in receptacle 2 cannot flow into the measuring cavity within body 1. In this normal unoperated state, passage 18 of actuator member 15 coincides with an opening 21 (not shown in FIG. 1 but shown in FIG. 2) through the bottom of body 1.

Upon operation of the dispenser by pushing actuator 4 into body 1 via actuator nose 19, a solid portion of plate 15, nearer nose 19 than passage 18, first closes off the opening 21 through the bottom of body 1. Upon further insertion of actuator 4 into body 1, passage 17 of plate 16 comes into coincidence with passage 7 in body 1 and material in receptacle 2 is then allowed to flow through passage 7 into the measuring cavity 24 within body 1. As actuator 4 is released a solid portion of plate 16, which is closest to passage 7, first closes off passage 7, then passage 18 of member 15 comes into coincidence with the hole 21 through the bottom of body 1 thereby allowing the material stored in the measuring cavity 24 to be discharged into another receptacle such as a cup or bowl (not shown) located below the dispenser. Thus it can be seen that actuator 4 with members 15 and 16 act as valve means to gate material in receptacle 2 into and out of cavity 24.

Referring to FIG. 2, therein is shown a side cut-away view of my assembled dispenser. Inner wall 26, is a suspended wall within body 1, and is fastened to and part of the side walls (not shown) of body 1, during the molding process of body 1. Inner wall 26 serves as one wall to form the measuring cavity 24 within body 1. In the alternative, inner wall 26 can be a separate member and appended, with appropriate fastening means, to the side walls of body 1 after the construction of body 1. The construction and form of inner wall 26 has been developed to provide slidable clearance and guidance to allow member 16 of actuator 4 to slidably pass over inner wall 26 and to allow member 15 of actuator 4 to slidably pass beneath inner wall 26 during the operation and assembly of my dispenser.

Inner wall 26 is provided with a spring guide or protusion 25 as a means of centering and guiding one end of coil spring 5 upon assembly of the dispenser. Upon assembly of the dispenser coil spring 5 is in compression and insures that actuator 4 will have its nose 19 extending through hole 14 through plate 3 when no external pressure is being applied to nose 19.

Spring guide 25 is rounded and is preferably molded as a part of wall 26 in the manufacture of dispenser body 1. This minimizes the number of pieces or members that make up my novel dispenser.

Prior to inserting actuator 4 into channel 8 of body 1 (FIG. 1), one end of coil spring 5 is inserted into depression or hole 20, in the back side of nose 19 of actuator 4. Depression 20 in actuator 4 has an appropriate depth and form to accept and hold coil spring 5 therein as actuator 4 is inserted into channel 8. The opposite end of coil spring 5 is thereby guided into spring guide 25. Upon complete assembly of my dispenser, coil spring 5 is supported between spring guide 25 and depression 20. The final insertion of actuator 4 into channel 8 of body 1 causes coil spring 5 to be further compressed between spring guide 5 and depression 20. As previously described, actuator 4 is inserted completely within body 1 so that retainer plate 3 may be slidably engaged and retained in grooves 13 of body 1. Actuator 4 is then released and spring 5 expands to push nose 19 through hole 14 of plate 3. Coil spring 5 remains compressed and maintains actuator 4 in the position shown in FIG. 2.

Whenever pressure, such as finger-tip pressure, is applied to nose 19 of actuator 4, actuator 4 moves into channel 8 of body 1 thereby causing coil spring 5 to further compress. Upon removal of external pressure from nose 19 of actuator 4, coil spring 5 will expand restoring actuator 4 to its normal or resting position with nose 19 extending through hole 14.

Measuring cavity 24 within body 1 is formed from inner walls 26, 27, and side walls (not shown) of body 1. The dimensions and placement of these walls control the volume of measuring cavity 24 and thereby control the amount of material that is measured and dispensed each time the dispenser is actuated.

Inner wall 27 of body 1 has channels 22 and 23 to slidably accept and engage members 15 and 16 of actuator 4. Channels 22 and 23 are also formed during the molding process of body 1 and have a a channel dimension that conforms to the shape and dimensions of plates 15 and 16 of actuator 4 so as not to impede the travel of plates 15 and 16 into their respective channels 22 and 23, nor to slidably engage plates 15 and 16 loosely.

Again referring to FIG. 2, therein is shown plates or members 15 and 16 of actuator 4 having appertures or passages 17 18. Passages 17 and 18 of actuator 4 are offset with respect to each other as previously described and are the means of controlling material entering and exiting measuring cavity 24. Placing the dispenser in its normal or resting position by the release of external pressure from nose 19 of actuator 4 causes passage 18 of plate 15 to be aligned with passage or hole 21 of body 1. In this state, plate 15 can be said to be in the normally open position. While plate 15 is in the normally open position, material that has accumulated in measuring cavity 24 of body 1 is allowed to flow through passage 18 and passage 21 respectively and into a container (not shown) placed beneath passage 21.

During the normal or resting state of the dispenser, passage 17 of actuator 4 does not coincide with passage 7 of body 1, but rather a solid portion of member or plate 16 covers or closes passage 7 of body 1. In this state, plate 16 can be said to be in the normally closed position and prevents material contained in receptacle or container 2 (FIGS. 1 and 3) from flowing into measuring cavity 24.

Actuator 4 initiates a measuring cycle whenever pressure is applied to nose 19 of actuator 4. The normal pressure required to start the measuring cycle is that pressure one would normally apply with the finger tips.

As pressure is applied to nose 19, actuator 4 responds thereto and travels into channel 8 from right to left (FIG. 2) causing coil spring 5 to compress. Members 15 and 16, cooperating with the movement of actuator 4, will be further inserted into their respective channels 22 and 23. First passage 18 of plate 15 closes off opening 21. Further travel of actuator 4 into channel 8 of body 1 will cause plates 15 and 16 to further enter channels 22 and 23 thereby aligning passage 17 with passage 7. On final travel of actuator 4 into body 1 coil spring 5 will be in its final compressed state, and passage 17 of plate 16 will be aligned with passage 7 of body 1. In this state of the measuring cycle material is allowed to flow from receptacle or container 2 through passage 7 of body 1 and passage 17 of plate 16 into measuring cavity 24 of the dispenser under the influence of gravity. The flow of material will cease when measuring cavity 24 becomes full.

The removal of pressure from nose 19 of actuator 4 starts the dispensing cycle and allows coil spring 5 to expand from its final compressed state. The expansion of coil spring 5 causes actuator 4 to travel out of channel 8 and to be restored to its normal or resting position as shown in FIG. 2. Plates 15 and 16, cooperating with the movement of actuator, are realigned to the normally open and normally closed states allowing material in cavity 24 to be dispensed via passage 21 of body 1 into a receptacle after preventing further material from flowing into measuring cavity 24 through passage 7 of body 1.

Though I have shown and asserted herein a particular construction, combination, and arrangement of parts, my invention is not limited to the particular embodiment shown herein. For example, the arrangement of the appertures or holes through valve plates or members 15 and 16 can be reversed. This latter arrangement would allow the measuring cavity to fill with material whenever the valve plates are in their normal positions and the measured material will be dispensed when the actuator is depressed. It is also obvious that the main body of the dispenser may be made more complex to provide apparatus or means to change the volume of the measuring cavity to dispense varied quantities of material.

I claim:

1. A dispenser comprising a support body having interior walls therein defining a first passage through said body and a channel, a portion of said first passage being closed off to define a measuring cavity, and the remaining portion of said first passage providing ingress to and egress from said measuring cavity, a container mounted on said support body adjacent to the portion of said first passage providing ingress to said cavity, a first valve plate and a second valve plate slidably mounted in said channel and protruding into said first passage to define a top and bottom of said measuring cavity, said plates cooperating such that said second plate closes the bottom of said cavity while said first plate opens the top of said cavity permitting ingress of material from said container into said cavity, and the top of said cavity is closed by said first plate before said second plate opens the the bottom of said cavity to permit egress of said material in said cavity from said dispenser, an actuator connected to said first and said second valve plates for operating both said plates, a spring functioning with said actuator, a retainer having an aperture therethrough and being slidably engaged in slots in the side of said support body to permit assembly of said dispenser, said actuator with both said valve plates connected thereto and said spring being inserted into said channel, a force being applied to said actuator to compress said spring to permit said actuator and said valve plates connected thereto to be completely inserted within said support body before said retainer is slidably engaged in said slots, upon the release of the force applied to said actuator said spring decompresses causing a nose portion of said actuator to protrude through said retainer aperture in a normal first position in which said first valve plate opens the top of said measuring cavity while said second valve plate closes the bottom of said cavity and a force is applied to said actuator nose portion to place said actuator in a second position where said first plate closes the top of said cavity while said second plate opens the bottom of said cavity.

2. The invention in accordance with claim 1 wherein said retainer has a hemispherical protrusion thereon and said support body has a hemispherical depression thereon which is in registration with said protrusion upon said retainer when said retainer is fully inserted into said slots in the side of said support body, said protrusion interfering with said support body as said retainer is inserted into said last mentioned slots to warp said retainer, and upon said retainer being fully inserted said protrusion goes into said depression removing the interference causing said retainer to warp and thereby holds said retainer in said slots.

* * * * *